United States Patent [19]
Rauchwerger

[11] 3,710,244
[45] Jan. 9, 1973

[54] CAPACITANCE PROBE FOR DETECTING MOISTURE WITH VERY LONG CABLES

[76] Inventor: George P. Rauchwerger, 147 Cromart Court, Sunnyvale, Calif. 94087

[22] Filed: Jan. 11, 1971

[21] Appl. No.: 105,254

Related U.S. Application Data

[63] Continuation-in-part of Ser. No. 777,219, Nov. 20, 1968, Pat. No. 3,626,286.

[52] U.S. Cl.................324/61 R, 317/246, 324/61 P
[51] Int. Cl. ............................................G01r 27/26
[58] Field of Search .......................324/61; 317/246

[56] References Cited

UNITED STATES PATENTS

| | | | |
|---|---|---|---|
| 2,555,977 | 6/1951 | Kline | 324/61 |
| 3,043,993 | 7/1962 | Maltby | 324/61 X |
| 2,373,846 | 4/1945 | Olken | 324/61 |
| 2,754,478 | 7/1956 | Goldsmith | 324/61 |
| 3,515,987 | 6/1970 | Zurbrick et al. | 324/61 |
| 3,519,922 | 7/1970 | Nash et al. | 324/61 |
| 3,341,774 | 9/1967 | Dyben | 324/61 |
| 3,523,243 | 8/1970 | Wagner | 324/61 |
| 3,421,077 | 1/1969 | Liu et al. | 324/61 |
| 2,285,152 | 6/1942 | Firestone | 324/61 |
| 3,022,499 | 2/1962 | Pipepi | 324/61 X |

FOREIGN PATENTS OR APPLICATIONS

| | | | |
|---|---|---|---|
| 160,355 | 3/1964 | U.S.S.R. | 324/61 |
| 701,862 | 1/1954 | Great Britain | 324/61 |
| 925,656 | 5/1963 | Great Britain | 324/61 |

*Primary Examiner*—Stanley T. Krawczewicz
*Attorney*—Julian Caplan

[57] ABSTRACT

A probe consists of two spaced elements, each consisting of a piece of foil, sheet, rod or tube, each insulated from the other and from the material whose moisture is to be measured. The elements are connected by two coaxial or one tri-axial cable to a remote piece of electronic equipment including an ultrasonic oscillator which transmits signals to the probes, which thus function as a variable capacitor, the variation being dependent on the moisture content of the said material in which the probes are imbedded. The equipment has a preamplifier (integrated circuit charge amplifier) having high frequency response and very low voltage differential between the two inputs. An integrated circuit peak detector provides a positive D.C. voltage proportional to the input peak voltage from the preamplifier. Such D.C. voltage may be measured by a microammeter to indicate moisture, or the output may be used to control a valve (for irrigation, e.g.) Several probes and valves may be used in an irrigation system, or the like.

7 Claims, 6 Drawing Figures

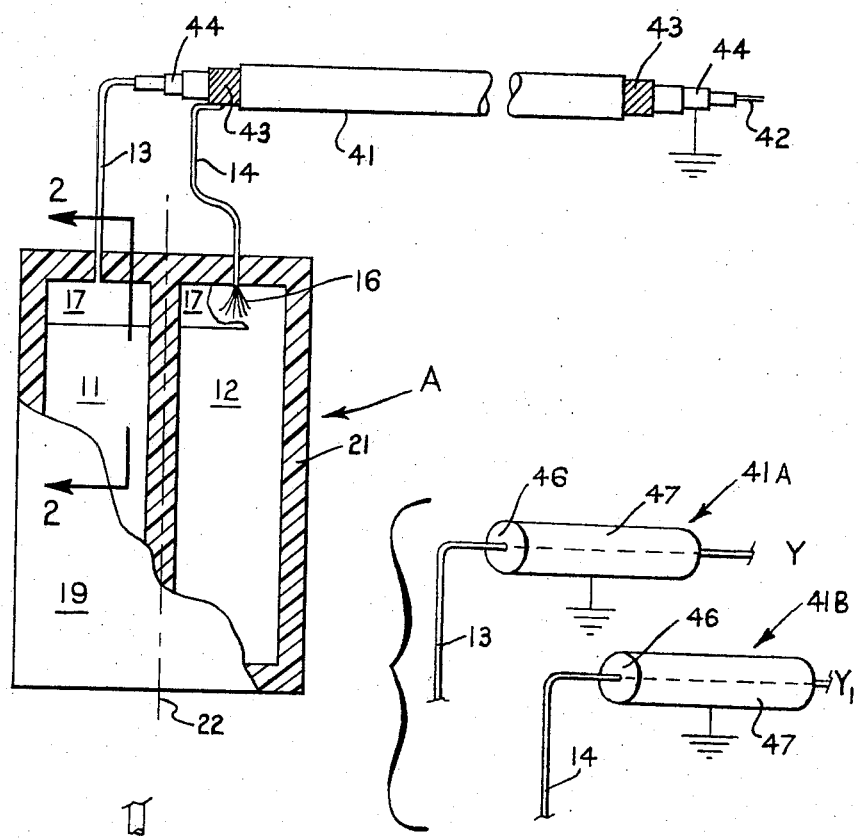
FIG. 1
FIG. 1A
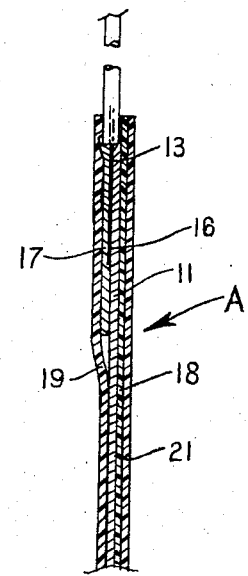
FIG. 2
INVENTOR.
GEORGE P. RAUCHWERGER
BY Julian Caplan
ATTORNEYS

CAPACITANCE PROBE FOR DETECTING MOISTURE WITH VERY LONG CABLES

This application is a continuation-in-part of copending application Ser. No. 777,219 filed Nov. 20, 1968, now U.S. Pat. No. 3,626,286.

This invention relates to a moisture measuring probe and to a control and measuring system of the type used, for example, in irrigation.

A principal object of the present invention is to accurately measure or sense moisture in a material, such as soil, by electronic means wherein the moisture of the material affects the capacitance between two insulated probes. A principal feature of the invention is the fact that the resistance or conductance of the soil does not affect the system and neither does absorption of water from the soil affect the system.

Another feature of the invention is the fact that the probes are protected from contact with the soil and thus are not subject to deterioration. The construction of the probes permits low manufacturing costs.

Another feature of the invention is the fact that the system may be used in a large field with the meter and control for the valve located at a considerable distance from the probes. More broadly, the electronics equipment, valve and the like may be located remote from the material under test.

A feature of the invention is the fact that a meter may be inserted in the electronic system which may be suitably calibrated to read directly the percentage of moisture in the material under test.

Another feature of the invention is the provision of valve control means to control irrigation or otherwise to regulate the percentage of moisture in a single area of multiple areas of the material being controlled.

Another important feature of the invention is the fact that the system has no mechanical movements other than the valve itself but, on the contrary, employ solid state electronic components which insure high reliability of operation, low maintenance, portability, and low voltage operation.

One other feature of the invention is the provision of manual controls to override electronic controls of the system.

Other objects of the present invention will become apparent upon reading the following specification and referring to the accompanying drawings in which similar characters of reference represent corresponding parts in each of the several views.

In the drawings:

FIG. 1 is a view of a probe used in the present invention, partly broken away to show internal construction.

FIG. 1A shows a modification of FIG. 1 using two coaxial cables attached to the circuit of FIG. 1 at points $Y, Y_1$.

FIG. 2 is an enlarged sectional view taken substantially along the line 2—2 of FIG. 1.

The present invention finds practical adaption of the principle that the moisture between two plates or other probes is directly proportional to the capacitance between them, as is derived from the expression of the capacitance for a parallel plate capacitor:

$$C = \epsilon(A/d)$$

where:
  $C$ = capacitance in farads
  $\epsilon$ = permittivity, $coul^2/n \cdot m^2$
  $A$ = Area of the plates, in $m^2$
  $d$ = distance between the plates, in $m$ The permittivity $$\epsilon = K \epsilon_0$$

where:
  $K$ = dielectric coefficient
  $\epsilon$ = permittivity in vacuum = $8.85 \times 10^{-12}$ $coul^2/n \cdot m^2$
  $\epsilon$ for water = $717 \times 10^{-12}$ $coul^2/n \cdot m^2$
  $K$ for water = 81
  $K$ for air = 1

If the plates of the capacitor are submerged entirely in water, then by definition, the volume of water between the plates is 100 percent, therefore, the capacitance between the plates will hold true to the formula with $K = 81$. If the volume of water between the plates is a fraction of 100 percent, then the capacitance also changes by the same fraction because the effective area of the plates is only the area in contact with the water.

If the plates are in a porous medium such as soil, the volume of water between the plates is directly proportional to the capacitance between the plates.

Figure 5:
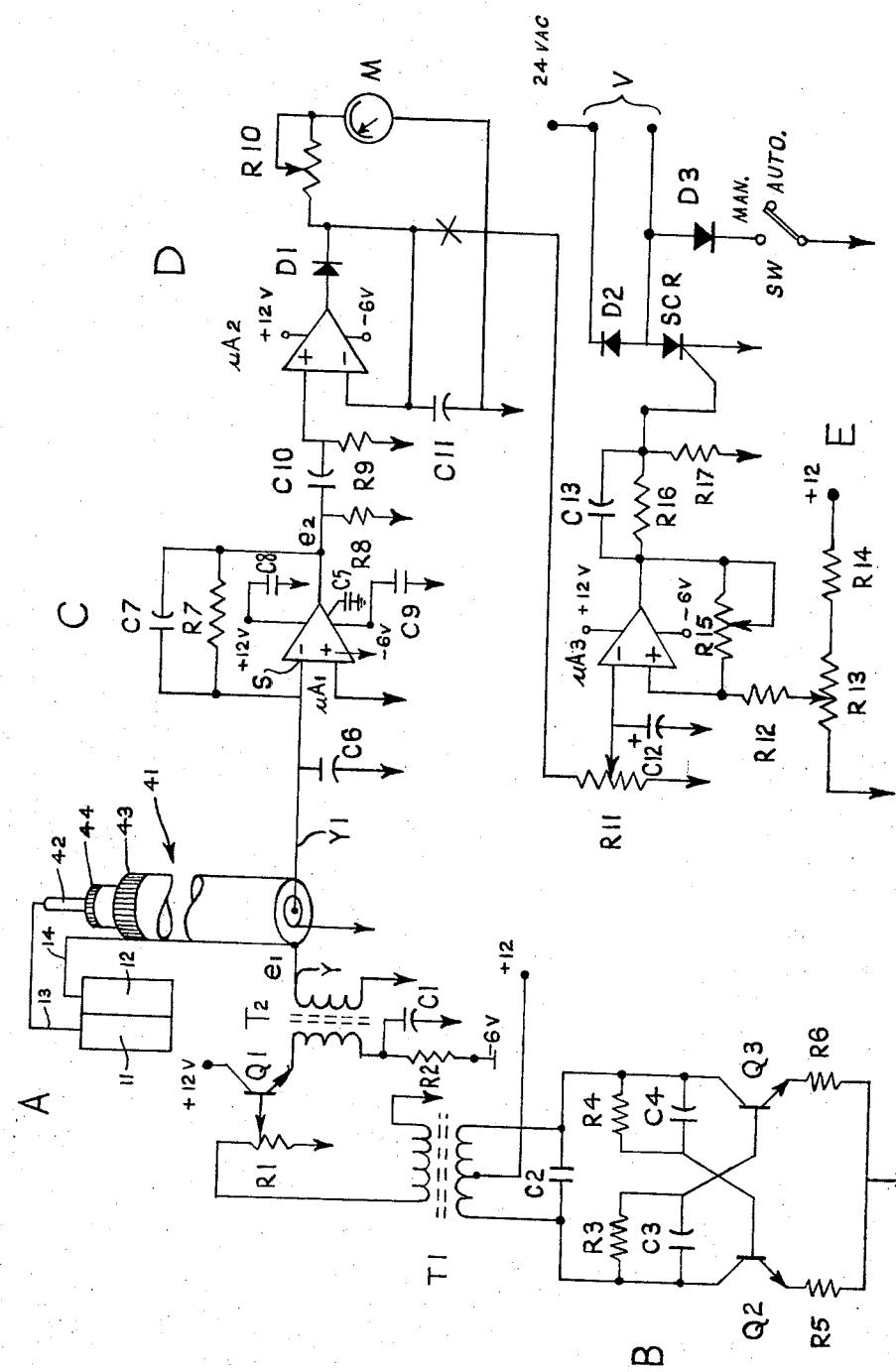
FIG. 5 is a schematic wiring diagram of an electrical system used with a probe.

Referring now to FIG. 5 of the drawings, there are five basic subcircuits comprising the system.
  A. The moisture probes.
  B. The oscillator.
  C. The preamplifier.
  D. The detector.
  E. The comparator.

In addition a meter M is shown in the circuit of FIG. 5 which reads the moisture of the material between the probes.

In essence, the oscillator B transmits a sinusoidal signal to the probes A, which function as a variable capacitor varying with moisture of the material therebetween. The voltage output from the probes becomes the input of the preamplifier C. The detector D consists of an integrated circuit which operates as a positive peak detector whose output is a positive D.C. voltage proportional to the input peaks. A meter M may be used to read directly the percentage of moisture. On the other hand, the comparator E may be used to control a valve V or other actuating device which is turned on when the moisture measured by the probes A is below a predetermined amount. A manual control may be used to override the electronic controls.

Directing attention first to FIGS. 1 and 2, the probe A consists of two strips 11, 12 of aluminum or copper foil or sheet which are attached to the splayed ends 16 of two insulated, stranded lead wires 13, 14 by a second piece of foil 17, which overlays ends 16. The foil 11, 12 is attached to a thin sheet 18 of a plastic, and the entire assembly 11, 12, 16, 17, and 18 is laminated under temperature and pressure between plastic layers 19, 21 of a material such as a vinyl or polyethylene. The lamination forms a hermetic seal all around foil 11, 12 and wire ends 16 so that they are completely, electrically insulated from the outside medium. The two strips of foil 11, 12 are also insulated from each other. The probe is so constructed that it can be used as a single element as shown or it may be cut through its middle along line 22 to form two separate probes, each of these separate probes containing one of the strips. If used as a single probe as shown in FIG. 1, it measures moisture in the vicinity surrounding it. If cut in half and used as two units, it will measure larger areas where the capacitance between the units is directly proportional to the moisture read on the meter.

The probe A is essentially a capacitor whose dielectric medium varies whether the material be liquid or solid. As has been indicated, where the outside medium varies in characteristics, the capacitance of the probe varies proportionally. Thus once the system is calibrated with whatever material is being tested it continues to measure the amount of capacitance for which it was set.

Figure 3:
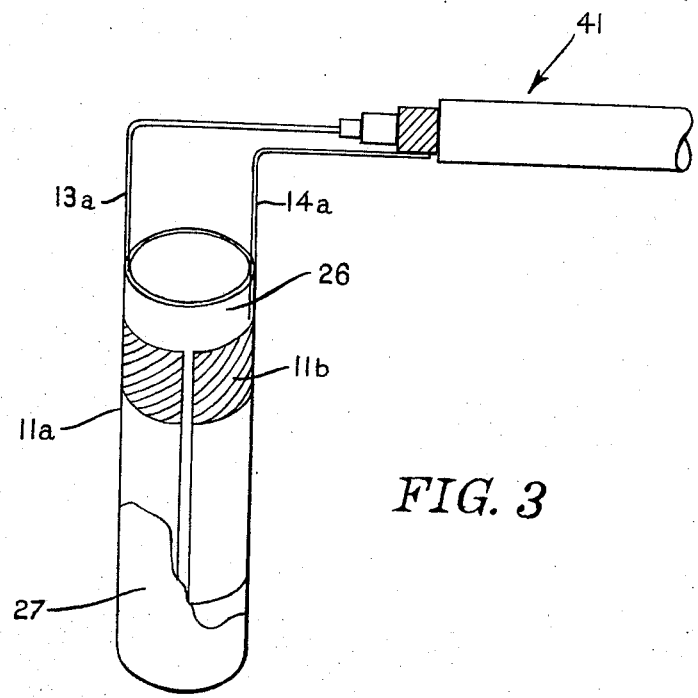
FIG. 3 is a perspective view of a modified probe.

FIG. 3 shows a modified probe. In this form of the invention an insulating cylinder 26 is at the center and at diametrically opposed parts of the exterior of the cylinder are strips 11a, 11b of copper or aluminum foil or the like which are secured to lead wires 13a, 14a. An outer seal 27 of Teflon, Kynar, Polyethylene or similar material covers and insulates the strips 11a, 11b from each other and from the exterior.

Figure 4:
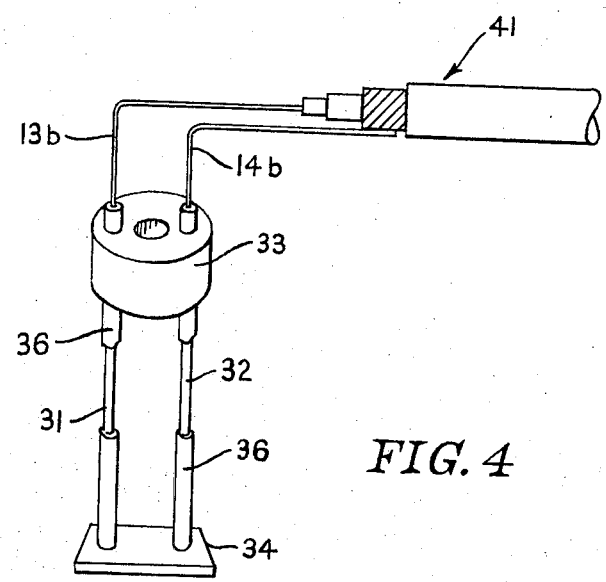
FIG. 4 is a perspective view of still another modified probe.

FIG. 4 still shows another modification wherein two metal rods 31, 32 or tubes are insulated from each other and spaced apart by top and bottom mounting blocks 33, 34. The spacer mounting blocks 33, 34 may be of Teflon or other insulated material. Both sides of the rods or tubes covered with an insulating layer 36 of a material which is Teflon, Kynar, Polyethylene or similar material. Lead wires 13b, 14b are connected to rods 31, 32.

For short distances, say up to 10 feet, 300 ohm twin lead wire may be used since its capacitance is relatively low compared to that of the probe. However, for very long cables, up to several thousand feet, two coaxial or one triaxial cable must be used. By connecting the triaxial with the center shield grounded, the effect of the capacitance in the cable is virtually eliminated. The outer shield and center conductor act as a grounded conductor placed between two plates grounded with charge on each of the plates thus eliminating the capacitance from the outside shield and the center shield. The only capacitance that is measured is the capacitance of the probe itself. What capacitance exists between the outer shield and the inner shield is taken care of with a good oscillator and preamplifier.

The lead wires 13, 14 of the probes, whether of the type of FIGS. 1, 3 or 4, are connected to a cable 41 which may be of extended length. The lead wire 13 of one probe, element 11, may be attached to the center conductor 42 of a triaxial cable 41 and the opposite probe element 12 connected to the outside conductor 43 of such cable and the immediate conductor 44 may be grounded. Alternatively, as shown in FIG. 1A, each of the lead wires 13, 14 may be connected to the center conductor 46 of a coaxial cable, 41A or 41B, the outer conductor 47 of which is grounded.

The oscillator B use for measuring moisture is preferably operated at a frequency between 100 Khz and 1 Mega Hz. Such frequency determines the relationship between the actual moisture and the readings obtained by the system. The frequency may be calibrated to any desired curve depending on the application, that is whether for measuring moisture in soil, or measuring moisture in various solids and powders. In any case, the readings are directly proportional to the conditions selected.

The transistor Q1 is an emitter follower with an impedance transformer T2 where the secondary of the transformer is a low impedance output in order to handle high capacitance loads, such as the long cable which connects the oscillator to the probes, without deteriorating the quality and amplitude of the sine wave.

R1 is a calibrating control which controls the output amplitude of the power amplifier. This control is provided to take into effect the various probes which may be used with the system and for initial overall calibration.

Preamplifier C is a circuit which measures the actual capacitance The relationship between the change in input capacitance of the probe A and the output voltage amplitude is a direct, linear relation. Capacitor C7 is the feedback capacitor which determines the sensitivity of the circuit. Thus, if the capacitance of the probe equals the capacitance of C7, then $e_1$ (the input voltage which is sent into the cable by the oscillator) equals $e_2$ (the output voltage of the preamplifier). Resistor R7 is much greater in magnitude than the capacitive reactance of C7. The function of R7 is to prevent the amplifier from drifting.

Capacitor C6 acts as an input radio frequency filter to suppress noise and radio interference picked up by the long probe cable 41. C10 is an additional filter which functions to suppress low frequency pickups such as 60Hz line frequency interference.

The preamplifier C consists of an integrated circuit operational amplifier where, as the probe capacitance varies, the changing charge is displaced into the summing point S shown in FIG. 5. This must be balanced by an equivalent displacement of charge across the feedback capacitor C7 caused by a change in the output voltage $e_2$. Since the probe is connected to the summing junction S, it is virtually immune to shunt capacitance by virtue of the properties of the amplifier. This then compensates for the capacitance of the long cable 41 from the center conductor 42 to ground.

The detector D consists of an integrated circuit comparator connected to operate as a positive peak detector. Capacitor C11 is charged to the peak value of the input wave form through diode D1 by comparing the voltage across the capacitor and across the input. The output is a positive DC voltage proportional to the input peak voltage.

The output of detector D may be connected at point X shown in FIG. 5 to the microammeter M through a calibrating potentiometer R10. The full scale reading is 200 microamperes. The power supply for the circuit (not shown) may be a high quality battery in order to make this instrument portable. However, the supply may be taken from any source and may be of any form as long as it provides the necessary DC voltage to the various circuits.

Comparator E is an integrated circuit which compares the output voltage of the detector against a manually controlled voltage containing the resistor network R11, R13 and R14. R11 is a calibration control. R14 determines the maximum percentage of moisture desired. R15 determines the percentage moisture differential between maximum and minimum percentage of moisture.

The output of comparator E is either a logic "high" or a logic "low" depending on the state of the input voltage. If the input voltage is greater than the reference voltage the output is "low;" and if the input is less than the reference voltage the output is "high." The hysteresis of the comparator is determined by R15, R12.

The output of comparator E is connected to voltage divider R16 and R17 and to the gate of the solid state switch SCR (silicon controlled rectifier). A triac may be used with the appropriate driving circuit instead of SCR. When the voltage at the gate of SCR is at a high state, the SCR turns on allowing the solenoid valve V which is connected to the terminals shown in FIG. 5 to be energized. When the voltage at the gate of SCR is at a low state, the SCR turns off and consequently the solenoid valve V turns off.

D2 reduces the conductive transients across the valve when the current through the valve solenoid reverses on the negative cycle of the forcing voltage.

Switch SW and diode D3 turn on the valve V by manual means, overriding the automatic control.

As shown in U.S. Pat. application Ser. No. 777,219, a multiple system where only one valve is turned on at a time, may be provided.

It will be understood that these circuits may vary slightly depending on the particular application or adaptation of this system, and that modifications of these circuits will not constitute a change in the original concept of measuring moisture as presented in the above paragraphs.

Representative suitable component values for the circuit illustrated in FIG. 5 are:

| | | | |
|---|---|---|---|
| R 1 10K | C 1 0.1f | | Q1,2N5296 |
| R 2 330Ω | C 2 0.01f | | Q2,2N5135 |
| R 3 100K | C 3 500µf | | Q3,2N5135 or equiv. |
| R 4 100K | C 4 500µf | | |
| R 5 470Ω | C 5 intentionally omitted | | µA1 — 702 |
| R 6 470Ω | C 6 0.01f | | µA2 — 710 |
| R 7 1 MEG | C 7 510µf | | µA3 — 710 |
| R 8 3.7K | C 8 0.01f | | |
| R 9 1 K | C 9 0.01f | | |
| R 10 2.5K | C10 0.01f | | |
| R 11 25K | C11 15µf | | M — 200µA |
| R 12 1 K | C12 15f | | |
| R 13 500Ω | C13 0.01f | SCR | C106 or equiv. |
| R 14 11 K | | | |
| R 15 100K | | D1 | FD-100 |
| R 16 2 K | | D2 | 1N4002 |
| R 17 1 K | | D3 | 1N4002 |
| | | T1 | D–41811–100 |
| | | T2 | D–41408–00 |
| | | V | 24VAC at 1 AMP. |

What is claimed is:

1. Probe means for sensing moisture in a solid or liquid medium by measuring capacitance between and across a first and a second conductive medium comprising a non-conductive, moisture-proof thin plastic sheet base, a first and a second strip of metallic foil separated from each other, a pair of electric lead wires having bare ends, thin metal foil means electrically connecting the bare end of one wire to one strip and the other bare end to the other strip, and a pair of plastic sheets on opposite sides of said probe means securing said strips to said base and insulating said strips from each other and from the exterior of said probe, said sheets comprising homogeneous plastic material completely surrounding said foil means, sheet base and bare ends of wire, said sheets laminated together and hermetically sealing said wires to said probe and insulating said wires and foil from said soil or liquid medium.

2. Probe means according to claim 1 which further comprises an elongated cable having two conductors and grounding means grounding the space between conductors to eliminate capacitance between said conductors, said cable comprising a triaxial cable, the central and outer conductor of said cable connected to said first and second foil and the middle conductor to ground.

3. Probe means according to claim 1 which further comprises elongated first and second coaxial cables, each having its outer conductor grounded and one of said lead wires connected to the central conductor of each said coaxial cable.

4. A probe according to claim 1 in which both said plastic sheets are formed of a material severable along a line between said strips to form two probes, movable relative to each other and each connected to a lead wire.

5. Probe means according to claim 1 in which said base is a cylinder and said strips are on opposite sides of the outside of said cylinder arranged parallel to the axis of said cylinder.

6. In combination, probe means according to claim 3 with said probe means imbedded directly in said medium, an oscillator having its output connected to one said cable, a positive peak detector having its input connected to the other said conductor, said detector emitting a positive D.C. voltage proportional to capacitance between said strips and a comparator receiving the output of said detector and comparing said output with an adjustable reference voltage and having a switch opened and closed depending on whether the capacitance between said foils is more or less than a predetermined value as set by said adjustable reference voltage.

7. The combination according to claim 6 which further comprises an amplifier between said other conductor and said detector and a feedback capacitor across said amplifier having a characteristic such that the input voltage sent into one said cable by said oscillator equals the output voltage of said amplifier when said feedback capacitor equals the capacitance of said probe in the material under test and wherein the output voltage of said amplifier varies inversely to the ratio of the feedback capacitor to the probe capacitor.

* * * * *